(12) United States Patent
Yerace et al.

(10) Patent No.: US 11,585,262 B2
(45) Date of Patent: *Feb. 21, 2023

(54) SYSTEMS AND METHOD FOR CONTROLLING AUTO-IGNITION

(71) Applicant: Transportation IP Holdings, LLC, Norwalk, CT (US)

(72) Inventors: Daniel Yerace, Erie, PA (US); Adam Edgar Klingbeil, Ballston Lake, NY (US); James Robert Mischler, Lawrence Park, PA (US)

(73) Assignee: Transportation IP Holdings, LLC, Norwalk, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/447,268

(22) Filed: Sep. 9, 2021

(65) Prior Publication Data

US 2021/0404371 A1  Dec. 30, 2021

Related U.S. Application Data

(60) Continuation-in-part of application No. 15/889,662, filed on Feb. 6, 2018, now Pat. No. 11,143,090, which
(Continued)

(51) Int. Cl.
*F02B 3/08* (2006.01)
*F02D 41/40* (2006.01)
(Continued)

(52) U.S. Cl.
CPC .............. *F02B 3/08* (2013.01); *F02D 19/061* (2013.01); *F02D 19/0692* (2013.01);
(Continued)

(58) Field of Classification Search
CPC ........ F02B 3/08; F02D 19/0692; F02D 29/02; F02D 19/105; F02D 19/061;
(Continued)

(56) References Cited

U.S. PATENT DOCUMENTS 4,606,322 A    8/1986  Reid et al.
4,846,129 A *  7/1989  Noble ................. F02P 17/12
                                                        123/634
(Continued)

FOREIGN PATENT DOCUMENTS

JP        2011157933 A     8/2011

*Primary Examiner* — Hung Q Nguyen
(74) *Attorney, Agent, or Firm* — McCoy Russell LLP

(57) ABSTRACT

Methods and systems are provided for maintaining combustion stability in a multi-fuel engine. In one example, a system may include first and second fuel systems to deliver liquid and gaseous fuels, respectively, to at least one cylinder of the engine, and a controller. The controller may be configured to supply the gaseous fuel to the at least one cylinder, inject the liquid fuel to the at least one cylinder to compression ignite the liquid fuel and combust the gaseous fuel in the at least one cylinder, and retard an injection timing of the injection of the liquid fuel based on a measured parameter associated with auto-ignition of end gases subsequent to the compression-ignition of the liquid fuel. In some examples, the controller may further be configured to adjust an amount of the gaseous fuel relative to an amount of the liquid fuel based on the measured parameter.

20 Claims, 6 Drawing Sheets

Related U.S. Application Data is a division of application No. 14/190,482, filed on Feb. 26, 2014, now Pat. No. 9,920,683.

(51) Int. Cl.
  *F02D 35/02* (2006.01)
  *F02D 41/00* (2006.01)
  *F02D 19/06* (2006.01)
  *F02D 19/10* (2006.01)
  *F02D 29/02* (2006.01)
  *F02D 41/30* (2006.01)
  *F02M 26/43* (2016.01)
  *F02M 26/05* (2016.01)
  *F02M 26/23* (2016.01)

(52) U.S. Cl.
  CPC ............ *F02D 19/105* (2013.01); *F02D 29/02* (2013.01); *F02D 35/027* (2013.01); *F02D 41/0025* (2013.01); *F02D 41/401* (2013.01); *F02D 41/008* (2013.01); *F02D 41/3047* (2013.01); *F02M 26/05* (2016.02); *F02M 26/23* (2016.02); *F02M 26/43* (2016.02); *Y02T 10/30* (2013.01); *Y02T 10/40* (2013.01)

(58) Field of Classification Search
  CPC .. F02D 41/0025; F02D 35/027; F02D 41/401; F02D 41/3047; F02D 41/008; F02M 26/05; F02M 26/23; F02M 26/43; Y02T 10/36; Y02T 10/44
  USPC .............................. 123/575, 577, 525, 27 GE
  See application file for complete search history.

(56) References Cited

U.S. PATENT DOCUMENTS

| | | | |
|---|---|---|---|
| 5,450,829 | A | 9/1995 | Beck |
| 5,605,207 | A | 2/1997 | Betcher et al. |
| 6,095,102 | A | 8/2000 | Willi et al. |
| 6,205,957 | B1 | 3/2001 | Saylor |
| 6,863,034 | B2 | 3/2005 | Kern et al. |
| 6,947,830 | B1 | 9/2005 | Froloff et al. |
| 9,920,683 | B2* | 3/2018 | Yerace .................. F02D 19/061 |
| 11,143,090 | B2* | 10/2021 | Yerace ...................... F02B 3/08 |
| 2001/0022168 | A1* | 9/2001 | Teraji .................. F02D 41/3047 123/295 |
| 2001/0027783 | A1* | 10/2001 | Hiraya ...................... F02B 1/12 123/90.16 |
| 2002/0059914 | A1* | 5/2002 | Yamaguchi ........... F02D 41/401 123/304 |
| 2002/0078918 | A1 | 6/2002 | Ancimer et al. |
| 2004/0118557 | A1 | 6/2004 | Ancimer et al. |
| 2005/0161017 | A1 | 7/2005 | Warlick |
| 2005/0268886 | A1* | 12/2005 | Etou ...................... F02D 35/02 123/406.29 |
| 2007/0125321 | A1 | 6/2007 | Ritter |
| 2008/0302329 | A1* | 12/2008 | Sloane ................ F02D 13/0265 123/299 |
| 2011/0288744 | A1 | 11/2011 | Gokhale et al. |
| 2012/0143480 | A1 | 6/2012 | Pursifull |
| 2013/0054116 | A1 | 2/2013 | Lepley |
| 2013/0178050 | A1 | 7/2013 | Kim et al. |
| 2013/0311066 | A1 | 11/2013 | Guimaraes et al. |

* cited by examiner

SYSTEMS AND METHOD FOR CONTROLLING AUTO-IGNITION

CROSS REFERENCE TO RELATED APPLICATIONS

The present application is a continuation-in-part of U.S. patent application Ser. No. 15/889,662, entitled "SYSTEMS AND METHOD FOR CONTROLLING AUTO-IGNITION," and filed on Feb. 6, 2018, which is a divisional of U.S. patent application Ser. No. 14/190,482, entitled "SYSTEMS AND METHOD FOR CONTROLLING AUTO-IGNITION," filed on Feb. 26, 2014, and issued as U.S. Pat. No. 9,920,683 on Mar. 20, 2018. The entire contents of each of the above-identified applications are hereby incorporated by reference for all purposes.

FIELD

Embodiments of the subject matter disclosed herein relate to an engine, engine components, and an engine system, for example.

BACKGROUND

Engines may be configured to operate with more than one fuel type. For example, engines may operate with liquid fuel, such as diesel, and gaseous fuel, such as natural gas. A mixture of gaseous fuel and air provided to a cylinder of an engine may be ignited when liquid fuel is injected into the cylinder. The compression of the cylinder ignites the liquid fuel and the gas/air mixture burns from the initiation site created by the liquid fuel combustion, forming a flame front that propagates to heat the unburned mixture ahead of the flame front. Under certain conditions where the temperature and pressure of the unburned gases reach an auto-ignition limit, combustion may be initiated before the flame front can initiate combustion, resulting in a secondary ignition point or volumetric ignition of the remaining mixture. If the secondary ignition point is formed or volumetric ignition occurs, detonation waves may be formed that can lead to engine degradation. Further, uncontrolled auto-ignition may result in high in-cylinder pressure, which may lead to engine degradation and potentially higher emissions due to higher in-cylinder temperatures.

BRIEF DESCRIPTION

In one embodiment, a system may include a first fuel system to deliver liquid fuel to at least one cylinder of an engine, a second fuel system to deliver gaseous fuel to the at least one cylinder, and a controller. The controller may be configured to control the supply of gaseous fuel to the at least one cylinder, control the injection of liquid fuel to the at least one cylinder to ignite the liquid fuel in the at least one cylinder via compression-ignition (and thereby to ignite the gaseous fuel), and adjust (e.g., retard) an injection timing of the injection of the liquid fuel based on a measured parameter associated with auto-ignition of end gases subsequent to the compression-ignition of the liquid fuel. (End gases are the part of the fuel-air mixture that has been introduced into the cylinder but not yet consumed in the flame-front reaction of the compression-ignition of the liquid fuel.) In some examples, the controller may further be configured to adjust an amount of the gaseous fuel relative to an amount of the liquid fuel based on the measured parameter.

In this way, upon indication that auto-ignition of end gases subsequent to the compression-ignition of the liquid fuel is occurring, the amount of gaseous fuel relative to the amount of liquid fuel may be decreased to reduce the auto-ignition. In some examples, the injection timing of the liquid fuel injection may be adjusted (e.g., retarded) prior to adjusting the amount of gaseous fuel relative to the amount of liquid fuel following the indication of auto-ignition.

It should be understood that the brief description above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The present invention will be better understood from reading the following description of non-limiting embodiments, with reference to the attached drawings, wherein below.

DETAILED DESCRIPTION

Figure 1:
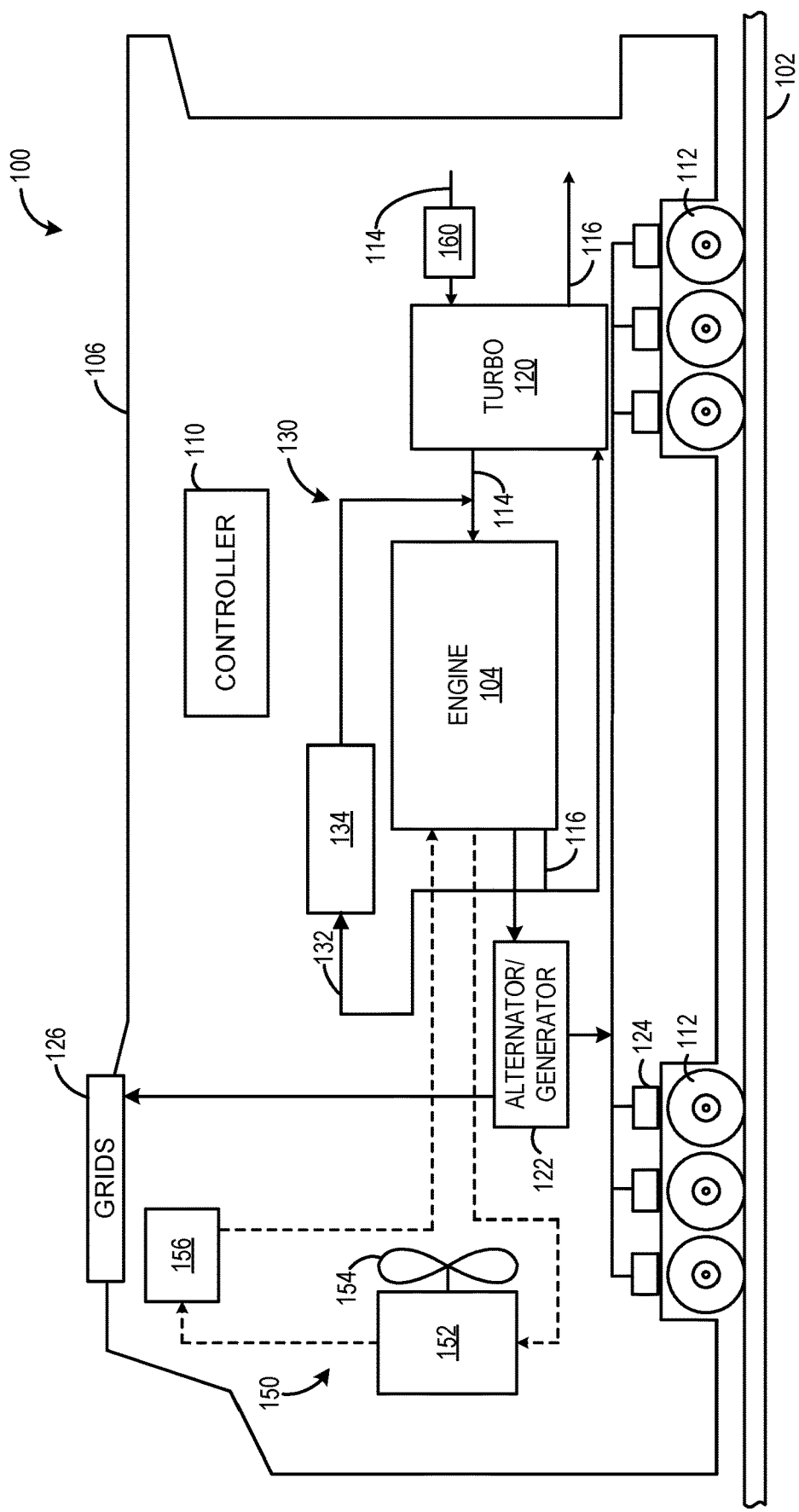
FIG. 1 shows a schematic diagram of a rail vehicle with an engine according to an embodiment of the invention.
Figure 2:
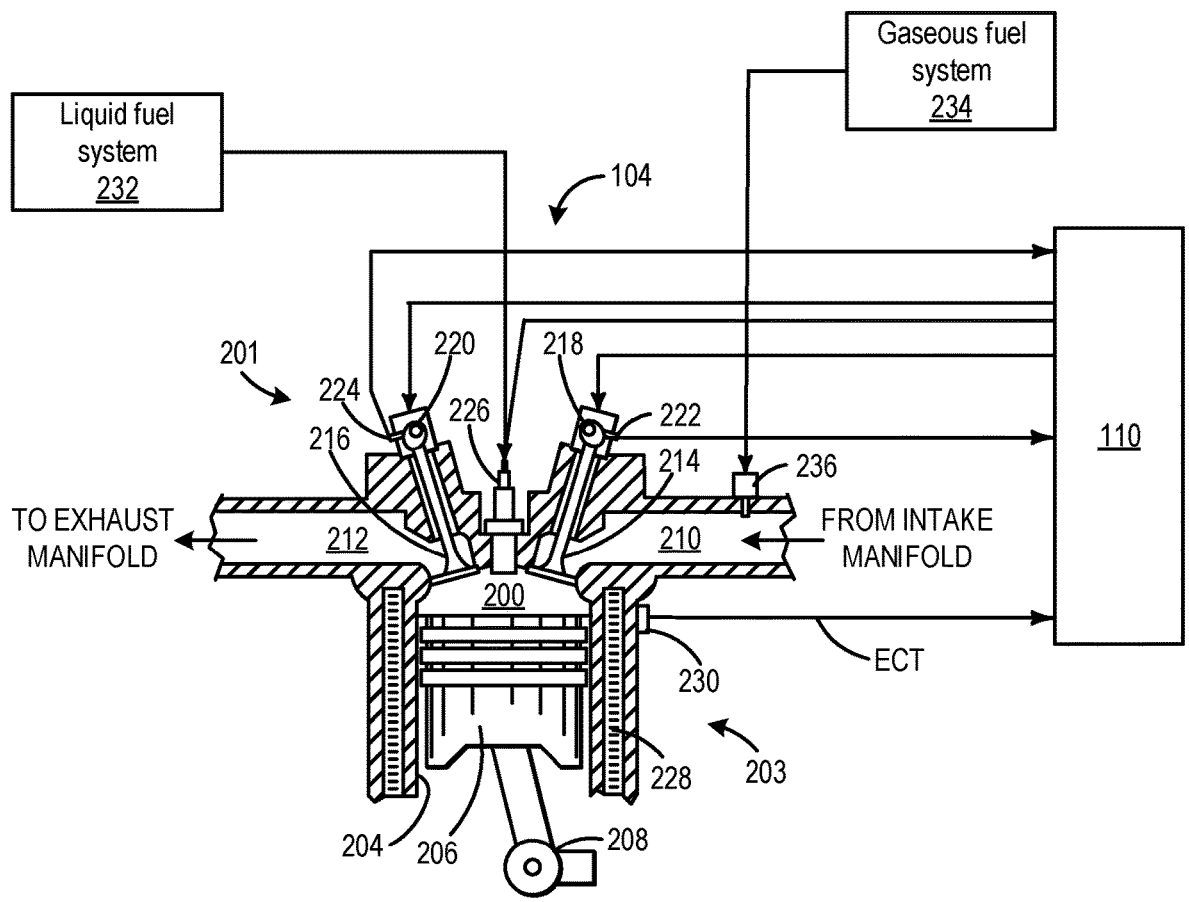
FIG. 2 shows a schematic diagram of a single cylinder of the engine of FIG. 1.
Figure 3:
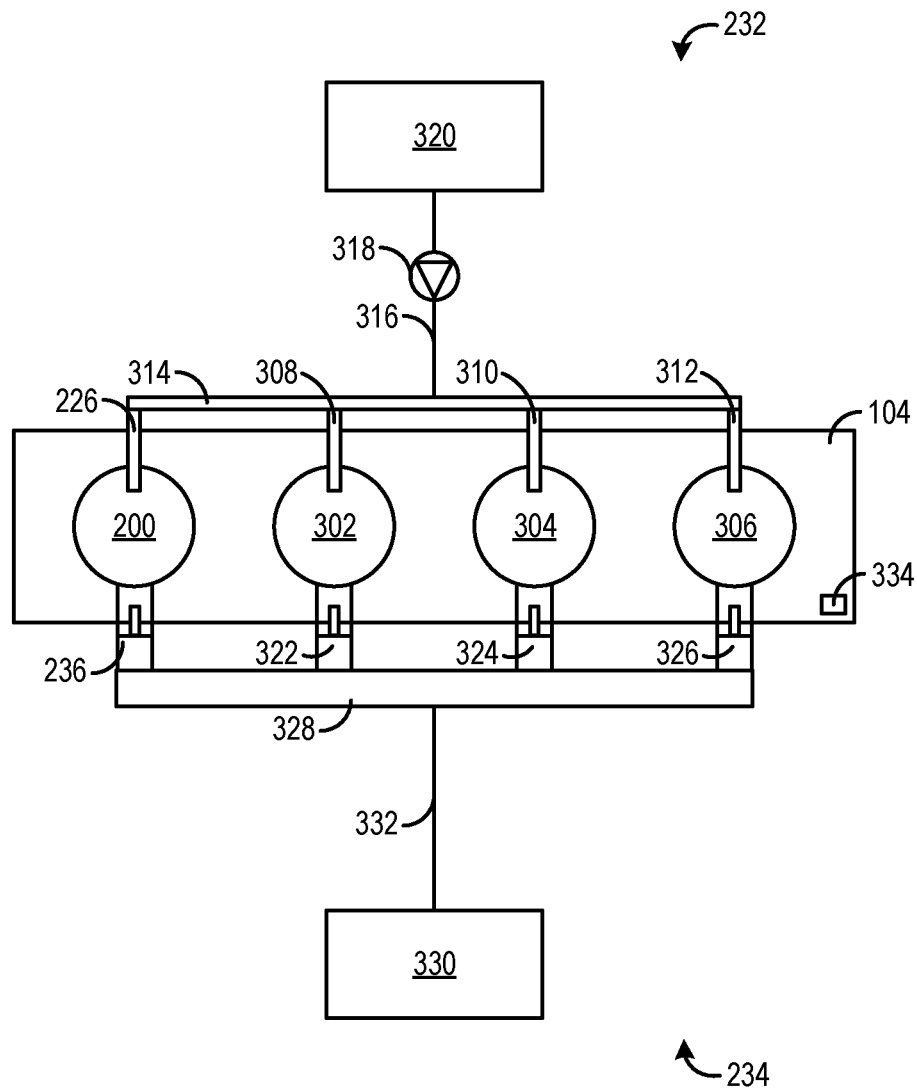
FIG. 3 shows a schematic diagram of the engine of FIGS. 1 and 2.

Auto-ignition of the end gases following ignition of the injected fuel may be a function of many different parameters, such as ignition (e.g., injection) timing, air temperature in the cylinder, and in-cylinder combustion mixture. Thus, to reduce auto-ignition, multiple factors may be adjusted, such as ignition timing. With respect to dual fuel engines which use diesel injection to ignite a premixed air/natural gas mixture, the substitution ratio is another factor which may affect auto-ignition. As the substitution ratio increases (where more energy is derived from premixed natural gas compared to the non-premixed diesel), the likelihood of auto-ignition combustion increases. According to embodiments disclosed herein, the substitution ratio is used as another lever to adjust to control auto-ignition. If auto-ignition is detected and other methods such as retarding diesel injection timing do not reduce the auto-ignition to acceptable levels, the substitution ratio may be decreased (e.g., gaseous fuel amount reduced and/or liquid fuel amount increased) until auto-ignition is eliminated. FIGS. 1-3 illustrate an engine configured to operate with two fuels, such as a liquid fuel and a gaseous fuel. Suitable liquid fuels may include one or more of diesel, gasoline, kerosene, ethanol, methanol, dimethyl ether (DME), or another liquid fuel type. Suitable gaseous fuels may include one or more of compressed natural gas, liquefied natural gas, ammonia, syngas, hydrogen, ethanol, methanol, DME, or another gaseous fuel type. The engine of FIGS. 1-3 may be controlled by a controller according to methods and routines illustrated in FIGS. 4-6.

The approach described herein may be employed in a variety of engine types, and a variety of engine-driven systems. Some of these systems may be stationary, while others may be on semi-mobile or mobile platforms. Semi-mobile platforms may be relocated between operational periods, such as mounted on flatbed trailers. Mobile platforms include self-propelled vehicles. Such vehicles can include on-road transportation vehicles, as well as mining equipment, marine vessels, rail vehicles, and other off-highway vehicles (OHV). For clarity of illustration, a locomotive is provided as an example of a mobile platform supporting a system incorporating an embodiment of the invention.

Before further discussion of the approach for reducing auto-ignition of end gases in a dual fuel engine, an example of a platform is disclosed in which an engine may be configured for a vehicle, such as a rail vehicle. For example, FIG. 1 shows a block diagram of an example embodiment of a vehicle system 100, herein depicted as a rail vehicle 106 (e.g., locomotive), configured to run on a rail 102 via a plurality of wheels 112. As depicted, the rail vehicle 106 includes an engine 104. In other non-limiting embodiments, the engine 104 may be a stationary engine, such as in a power-plant application, or an engine in a marine vessel or other off-highway vehicle propulsion system as noted above.

The engine 104 receives intake air for combustion from an intake passage 114. The intake passage 114 receives ambient air from an air filter 160 that filters air from outside of the rail vehicle 106. Exhaust gas resulting from combustion in the engine 104 is supplied to an exhaust passage 116. Exhaust gas flows through the exhaust passage 116, and out of an exhaust stack of the rail vehicle 106. In one example, the engine 104 is a diesel engine that combusts air and diesel fuel through compression ignition. In another example, engine 104 is a dual or multi-fuel engine that may combust a mixture of gaseous fuel and air upon injection and compression ignition of diesel fuel. In other non-limiting embodiments, the engine 104 may additionally combust fuel including gasoline, hydrogen, ammonia, alcohol such as ethanol (EtOH) and/or methanol, kerosene, natural gas, biodiesel, or other petroleum distillates of similar density through compression ignition (and/or spark ignition).

In one embodiment, the rail vehicle 106 is a diesel-electric vehicle. As depicted in FIG. 1, the engine 104 is coupled to an electric power generation system, which includes an alternator/generator 122 and electric traction motors 124. For example, the engine 104 is a diesel and/or natural gas engine that generates a torque output that is transmitted to the alternator/generator 122 which is mechanically coupled to the engine 104. In one embodiment herein, engine 104 is a multi-fuel engine operating with diesel fuel and natural gas, but in other examples engine 104 may use various combinations of fuels other than diesel and natural gas. In one example, diesel may be replaced by or supplemented with a liquid fuel including biodiesel, ethanol, methanol, or DME. In an additional or alternative example, natural gas may be replaced by or supplemented with a gaseous fuel including hydrogen, ammonia, syngas, ethanol, methanol, or DME.

Regarding ethanol, methanol, and DME, such fuels may be stored as compressed liquids or may be liquids at room temperature (e.g., 20° C.), and may serve as liquid ignition sources (e.g., supplied via a liquid fuel system) in some examples. However, ethanol, methanol, or DME may be vaporized to the gaseous form upon injection into an intake manifold of the engine 104 (e.g., via a gaseous fuel system separate from the liquid fuel system). Thus, for example, ethanol, methanol, or DME may be port injected with diesel fuel serving as the liquid ignition source in a multi-fuel configuration.

The alternator/generator 122 produces electrical power that may be stored and applied for subsequent propagation to a variety of downstream electrical components. As an example, the alternator/generator 122 may be electrically coupled to a plurality of traction motors 124 and the alternator/generator 122 may provide electrical power to the plurality of traction motors 124. As depicted, the plurality of traction motors 124 are each connected to one of a plurality of wheels 112 to provide tractive power to propel the rail vehicle 106. One example configuration includes one traction motor per wheel set. As depicted herein, six pairs of traction motors correspond to each of six pairs of motive wheels of the rail vehicle. In another example, alternator/generator 122 may be coupled to one or more resistive grids 126. The resistive grids 126 may be configured to dissipate excess engine torque via heat produced by the grids from electricity generated by alternator/generator 122.

In some embodiments, the vehicle system 100 may include a turbocharger 120 that is arranged between the intake passage 114 and the exhaust passage 116. The turbocharger 120 increases air charge of ambient air drawn into the intake passage 114 in order to provide greater charge density during combustion to increase power output and/or engine-operating efficiency. The turbocharger 120 may include a compressor (not shown) which is at least partially driven by a turbine (not shown). While in this case a single turbocharger is included, the system may include multiple turbine and/or compressor stages. Additionally or alternatively, in some embodiments, a supercharger may be present to compress the intake air via a compressor driven by a motor or the engine, for example. Further, in some embodiments, a charge air cooler may be present between the compressor of the turbocharger or supercharger and the intake manifold of the engine. The charge air cooler may cool the compressed air to further increase the density of the charge air.

In some embodiments, the vehicle system 100 may further include an aftertreatment system coupled in the exhaust passage upstream and/or downstream of the turbocharger 120. In one embodiment, the aftertreatment system may include a diesel oxidation catalyst (DOC) and a diesel particulate filter (DPF). In other embodiments, the aftertreatment system may additionally or alternatively include one or more emission control devices. Such emission control devices may include a selective catalytic reduction (SCR) catalyst, three-way catalyst, $NO_x$ trap, or various other devices or systems.

The vehicle system 100 may further include an exhaust gas recirculation (EGR) system 130 coupled to the engine 104, which routes exhaust gas from an exhaust passage 116 of the engine 104 to the intake passage 114 downstream of the turbocharger 120. In some embodiments, the EGR system 130 may be coupled exclusively to a group of one or more donor cylinders of the engine (also referred to a donor cylinder system). As depicted in FIG. 1, the EGR system 130 includes an EGR passage 132 and an EGR cooler 134 to reduce the temperature of the exhaust gas before it enters the intake passage 114. By introducing exhaust gas to the engine 104, the amount of available oxygen for combustion is decreased, thereby reducing the combustion flame temperatures and reducing the formation of nitrogen oxides (e.g., $NO_R$).

In some embodiments, the EGR system 130 may further include an EGR valve for controlling an amount of exhaust gas that is recirculated from the exhaust passage 116 of the engine 104 to the intake passage 114 of engine 104. The EGR valve may be an on/off valve controlled by the controller 110, or it may control a variable amount of EGR, for example. As shown in the non-limiting example embodiment of FIG. 1, the EGR system 130 is a high-pressure EGR system. In other embodiments, the vehicle system 100 may additionally or alternatively include a low-pressure EGR system, routing EGR from downstream of the turbine to upstream of the compressor.

As depicted in FIG. 1, the vehicle system 100 further includes a cooling system 150. The cooling system 150 circulates coolant through the engine 104 to absorb waste engine heat and distribute the heated coolant to a heat exchanger, such as a radiator 152. A fan 154 may be coupled to the radiator 152 in order to maintain an airflow through the radiator 152 when the rail vehicle 106 is moving slowly or stopped while the engine is running. In some examples, fan speed may be controlled by a controller, such as controller 110. Coolant which is cooled by the radiator 152 enters a tank 156. The coolant may then be pumped by a water, or coolant, pump (not shown) back to the engine 104 or to another component of the vehicle system, such as the EGR cooler and/or charge air cooler.

The rail vehicle 106 further includes an engine controller 110 (referred to hereafter as the controller) to control various components related to the rail vehicle 106. As an example, various components of the vehicle system may be coupled to the controller 110 via a communication channel or data bus. In one example, the controller 110 includes a computer control system. The controller 110 may additionally or alternatively include a memory holding non-transitory computer readable storage media (not shown) including code for enabling on-board monitoring and control of rail vehicle operation. In some examples, controller 110 may include more than one controller each in communication with one another, such as a first controller to control the engine and a second controller to control other operating parameters of the locomotive (such as tractive motor load, blower speed, etc.). The first controller may be configured to control various actuators based on output received from the second controller and/or the second controller may be configured to control various actuators based on output received from the first controller.

The controller 110 may receive information from a plurality of sensors and may send control signals to a plurality of actuators. The controller 110, while overseeing control and management of the engine 104 and/or rail vehicle 106, may be configured to receive signals from a variety of engine sensors, as further elaborated herein, in order to determine operating parameters and operating conditions, and correspondingly adjust various engine actuators to control operation of the engine 104 and/or rail vehicle 106. For example, the engine controller 110 may receive signals from various engine sensors including, but not limited to, engine speed, engine load, intake manifold air pressure, boost pressure, exhaust pressure, ambient pressure, ambient temperature, exhaust temperature, particulate filter temperature, particulate filter back pressure, engine coolant pressure, gas temperature in the EGR cooler, or the like. Correspondingly, the controller 110 may control engine 104 and/or the rail vehicle 106 by sending commands to various components such as the traction motors 124, the alternator/generator 122, fuel injectors, or the like. For example, the controller 110 may control the timing and/or duration of liquid fuel injection, and/or the timing and/or duration of gaseous fuel supply, as described below. Other actuators may be coupled to various locations in the rail vehicle.

FIG. 2 depicts an embodiment of a combustion chamber, or cylinder 200, of a multi-cylinder internal combustion engine, such as the engine 104 described above with reference to FIG. 1. Cylinder 200 may be defined by a cylinder head 201, housing the intake and exhaust valves and liquid fuel injector, described below, and a cylinder block 203.

The engine may be controlled at least partially by a control system including controller 110 which may be in further communication with a vehicle system, such as the vehicle system 100 described above with reference to FIG. 1. As described above, the controller 110 may further receive signals from various engine sensors including, but not limited to, engine speed, engine load, boost pressure, exhaust pressure, ambient pressure, $CO_2$ levels, exhaust temperature, $NO_x$ emission, engine coolant temperature (ECT) from temperature sensor 230 coupled to cooling sleeve 228, etc. Correspondingly, the controller 110 may control the vehicle system by sending commands to various components such as alternator, cylinder valves, throttle, fuel injectors, etc.

The cylinder (i.e., combustion chamber) 200 may include cylinder liner 204 with a piston 206 positioned therein. The piston 206 may be coupled to a crankshaft 208 so that reciprocating motion of the piston is translated into rotational motion of the crankshaft. In some embodiments, the engine may be a four-stroke engine in which each of the cylinders fires in a firing order during two revolutions of the crankshaft 208. In other embodiments, the engine may be a two-stroke engine in which each of the cylinders fires in a firing order during one revolution of the crankshaft 208.

The cylinder 200 receives intake air for combustion from an intake including an intake passage 210. The intake passage 210 receives intake air via an intake manifold. The intake passage 210 may communicate with other cylinders of the engine in addition to the cylinder 200, for example, or the intake passage 210 may communicate exclusively with the cylinder 200.

Exhaust gas resulting from combustion in the engine is supplied to an exhaust including an exhaust passage 212. Exhaust gas flows through the exhaust passage 212, to a turbocharger in some embodiments (not shown in FIG. 2) and to atmosphere, via an exhaust manifold. The exhaust passage 212 may further receive exhaust gases from other cylinders of the engine in addition to the cylinder 200, for example.

Each cylinder of the engine may include one or more intake valves and one or more exhaust valves. For example, the cylinder 200 is shown including at least one intake poppet valve 214 and at least one exhaust poppet valve 216 located in an upper region of cylinder 200. In some embodiments, each cylinder of the engine, including cylinder 200, may include at least two intake poppet valves and at least two exhaust poppet valves located at the cylinder head.

The intake valve 214 may be controlled by the controller 110 via an actuator 218. Similarly, the exhaust valve 216 may be controlled by the controller 110 via an actuator 220. During some conditions, the controller 110 may vary the signals provided to the actuators 218 and 220 to control the opening and closing of the respective intake and exhaust valves. The position of the intake valve 214 and the exhaust valve 216 may be determined by respective valve position sensors 222 and 224, respectively, and/or by cam position sensors. The valve actuators may be of the electric valve actuation type or cam actuation type, or a combination thereof, for example.

The intake and exhaust valve timing may be controlled concurrently or any of a possibility of variable intake cam timing, variable exhaust cam timing, dual independent variable cam timing or fixed cam timing may be used. In other embodiments, the intake and exhaust valves may be controlled by a common valve actuator or actuation system, or a variable valve timing actuator or actuation system. Further, the intake and exhaust valves may by controlled to have variable lift by the controller based on operating conditions.

In still further embodiments, a mechanical cam lobe may be used to open and close the intake and exhaust valves. Additionally, while a four-stroke engine is described above, in some embodiments a two-stroke engine may be used, where the intake valves are dispensed with and ports in the cylinder wall are present to allow intake air to enter the cylinder as the piston moves to open the ports. This can also extend to the exhaust, although in some examples exhaust valves may be used.

In some embodiments, each cylinder of the engine may be configured with one or more fuel injectors for providing fuel thereto. As a non-limiting example, FIG. 2 shows the cylinder 200 is including a fuel injector 226. The fuel injector 226 is shown coupled directly to the cylinder 200 for injecting fuel directly therein. In this manner, fuel injector 226 provides what is known as direct injection of a fuel into combustion cylinder 200. The fuel may be delivered to the fuel injector 226 from a first, liquid fuel system 232, including a fuel tank, fuel pumps, and a fuel rail (described in more detail with respect to FIG. 3). In one example, the fuel is diesel fuel that is combusted in the engine through compression ignition. In other non-limiting embodiments, the fuel may be gasoline, kerosene, biodiesel, or other petroleum distillates of similar density through compression ignition (and/or spark ignition), or ethanol, or methanol, or DME, or another liquid fuel.

Further, each cylinder of the engine may be configured to receive gaseous fuel (e.g., compressed or liquefied natural gas, ammonia, syngas, hydrogen, ethanol, methanol, DME, etc.) alternative to or in addition to diesel fuel. The gaseous fuel may be provided to cylinder 200 via the intake manifold, as explained below. As shown in FIG. 2, the intake passage 210 may receive a supply of gaseous fuel from a second, gaseous fuel system 234, via one or more gaseous fuel lines, pumps, pressure regulators, etc., located upstream of the cylinder. In some embodiments, gaseous fuel system 234 may be located remotely from engine 104, such as on a different rail car (e.g., on a fuel tender car), and the gaseous fuel may be supplied to the engine 104 via one or more fuel lines that traverse the separate cars. However, in other embodiments gaseous fuel system 234 may be located on the same rail car as engine 104.

A plurality of gas admission valves, such as gas admission valve 236, may be configured to supply gaseous fuel from gaseous fuel system 234 to each respective cylinder via respective intake passages. For example, a degree and/or duration of opening of gas admission valve 236 may be adjusted to regulate an amount of gaseous fuel provided to the cylinder. As such, each respective cylinder may be provided with gaseous fuel from an individual gas admission valve, allowing for individual cylinder control in the amount of gaseous fuel provided to the cylinders. However, in some embodiments, a single-point fumigation system may be used, where gaseous fuel is mixed with intake air at a single point upstream of the cylinders. In such a configuration, each cylinder may be provided with substantially similar amounts of gaseous fuel. To regulate the amount of gaseous fuel provided by the single-point fumigation system, in some examples a gaseous fuel control valve may be positioned at a junction between a gaseous fuel supply line and the engine intake air supply line or intake manifold. The gaseous fuel control valve degree and/or duration of opening may be adjusted to regulate the amount of gaseous fuel admitted to the cylinders. In other examples, the amount of gaseous fuel admitted to the cylinders in the single-point fumigation system may be regulated by another mechanism, such as control of a gaseous fuel regulator, via control of a gaseous fuel pump, etc.

FIG. 3 illustrates multiple cylinders of engine 104, including cylinder 200, cylinder 302, cylinder 304, and cylinder 306. While four cylinders arranged in-line are illustrated in FIG. 3, such an arrangement is non-limiting, and other engine configurations are possible. For example, engine 104 may be a V-6, V-8, V-12, V-16, I-6, I-8, or other engine type. Engine 104 may be supplied one or more of a first fuel and a second fuel. For example, the first fuel may be liquid fuel from liquid fuel system 232 and the second fuel may be gaseous fuel from gaseous fuel system 234. As such, each cylinder of engine 104 includes a liquid fuel injector, including injector 226 as well as injectors 308, 310, and 312. Each liquid fuel injector is supplied with liquid fuel from a common fuel rail 314. Common fuel rail 314 may be supplied with fuel from liquid fuel tank 320 via supply line 316. The fuel may be provided at a high pressure via one or more fuel pumps, such as pump 318. The liquid fuel in liquid fuel system 232 may be diesel fuel or another liquid fuel, such as gasoline, alcohol, etc. Further, while a common fuel rail system is illustrated in FIG. 3, a non-common rail unit pump injection system may be used.

Each cylinder of engine 104 may similarly include a gas admission valve to supply gaseous fuel, including gas admission valve 236 as well as gas admission valves 322, 324, and 326. Each gas admission valve may be positioned in an intake passage of a respective cylinder, or other suitable location. The gas admission valves may be supplied gaseous fuel, such as natural gas, from a gaseous fuel passage 328. The gaseous fuel passage 328 may receive gaseous fuel from a gaseous fuel tank 330 via a supply line 332. As explained previously, gaseous fuel tank 330 may be located remotely from engine 104. However, in some embodiments, the individual gas admission valves may be dispensed with, and all the cylinders may be supplied with the same gaseous fuel/intake air mixture from an upstream single-point fumigation system.

Each liquid fuel injector of each cylinder, as well as each gas admission valve of each cylinder, may be individually controlled by a controller (such as controller 110) to enable individual cylinder control of the fuel supply. Accordingly, each cylinder may be operated with varying levels of liquid fuel and/or gaseous fuel. In some embodiments, the liquid fuel injectors may be controlled by a different controller than the controller that controls the gas admission valves. Further, in a gaseous fumigation system, rather than controlling the individual gas admission valves, a single gaseous fuel control valve or other gaseous fuel control element may be controlled by the controller to regulate the amount of gaseous fuel admitted to the cylinders.

In an example, a mixture of gaseous fuel and air may be provided to cylinder 200 via intake passage 210 and, in some embodiments, gas admission valve 236. Then, during compression, diesel fuel may be injected to cylinder 200 via fuel injector 226. The diesel fuel may be ignited via compression ignition and subsequently ignite the gaseous fuel via a propagating flame front resulting from the compression ignition.

During a standard combustion event in a multi-fuel engine, the compression ignition of the liquid (e.g., diesel) fuel initiates combustion of a mixture of air and fuel (such as gaseous fuel), causing a combustion flame front to develop that spreads across the cylinder consuming unburned fuel/air mix. The flame front typically moves away from the site of ignition and across the combustion chamber. However, under certain conditions a second flame front may unintentionally and undesirably develop away from the first flame front. The second flame front may occur after the liquid fuel combustion initiates combustion of the gaseous fuel/air mixture and results from compressing and heating of the unburned gaseous fuel/air mixture ahead of the flame front to a high enough level that the end gas mixture auto-ignites ahead of the flame front. If the first flame front meets the second flame front, cylinder vibrations may occur that can result in engine damage. Further, the auto-ignition of end gases may degrade emissions.

To detect the presence of auto-ignition in one or more cylinders of engine 104, one or more vibration and/or acceleration sensors 334 may be present. Auto-ignition sensor 334 may be configured to detect vibrations to the engine caused by auto-ignition. As such, auto-ignition sensor 334 may include an accelerometer or other motion sensor, a microphone or other acoustic sensor, a laser, and/or other sensor. To detect auto-ignition on an individual cylinder level, each cylinder may include an auto-ignition sensor. In other examples, one auto-ignition sensor may be used, and the cylinder(s) undergoing auto-ignition may be identified based on correlation to cylinder firing order/engine position.

Engines configured to operate with both liquid and gaseous fuel may be operated with as much gaseous fuel as possible while still maintaining requested engine power. For example, in standard liquid-fueled engines, such as diesel engines, 100% of produced engine power may be derived from combustion of diesel fuel. In multi-fuel engines, a portion of the engine power may be derived from gaseous fuel while the remaining engine power may be derived from liquid fuel. For example, as much as 80% of produced engine power may be derived from combustion of gaseous fuel, with the remaining 20% of power derived from the combustion of diesel fuel. The amount of gaseous fuel "substituted" for the liquid fuel may be referred to as the substitution ratio. The substitution ratio may reflect the portion of engine power derived from gaseous fuel. For example, a substitution ratio of 80 indicates 80% of the power is derived from gaseous fuel, while a substitution ratio of 50 indicates 50% of the power is derived from gaseous fuel. A substitution ratio of 0 indicates liquid-only operation.

However, as the substitution ratio increases (e.g., as the amount of gaseous fuel present during combustion increases and/or the amount of liquid fuel present decreases), the auto-ignition of the end gases may increase. According to embodiments described herein, auto-ignition of end gasses may be monitored (based on output from the auto-ignition sensor, for example) and if auto-ignition is detected, the substitution ratio may be decreased until the auto-ignition ceases. Once the auto-ignition has stopped, the substitution ratio may be increased again until a maximum desired substitution ratio that does not produce auto-ignition is identified.

Figure 4:
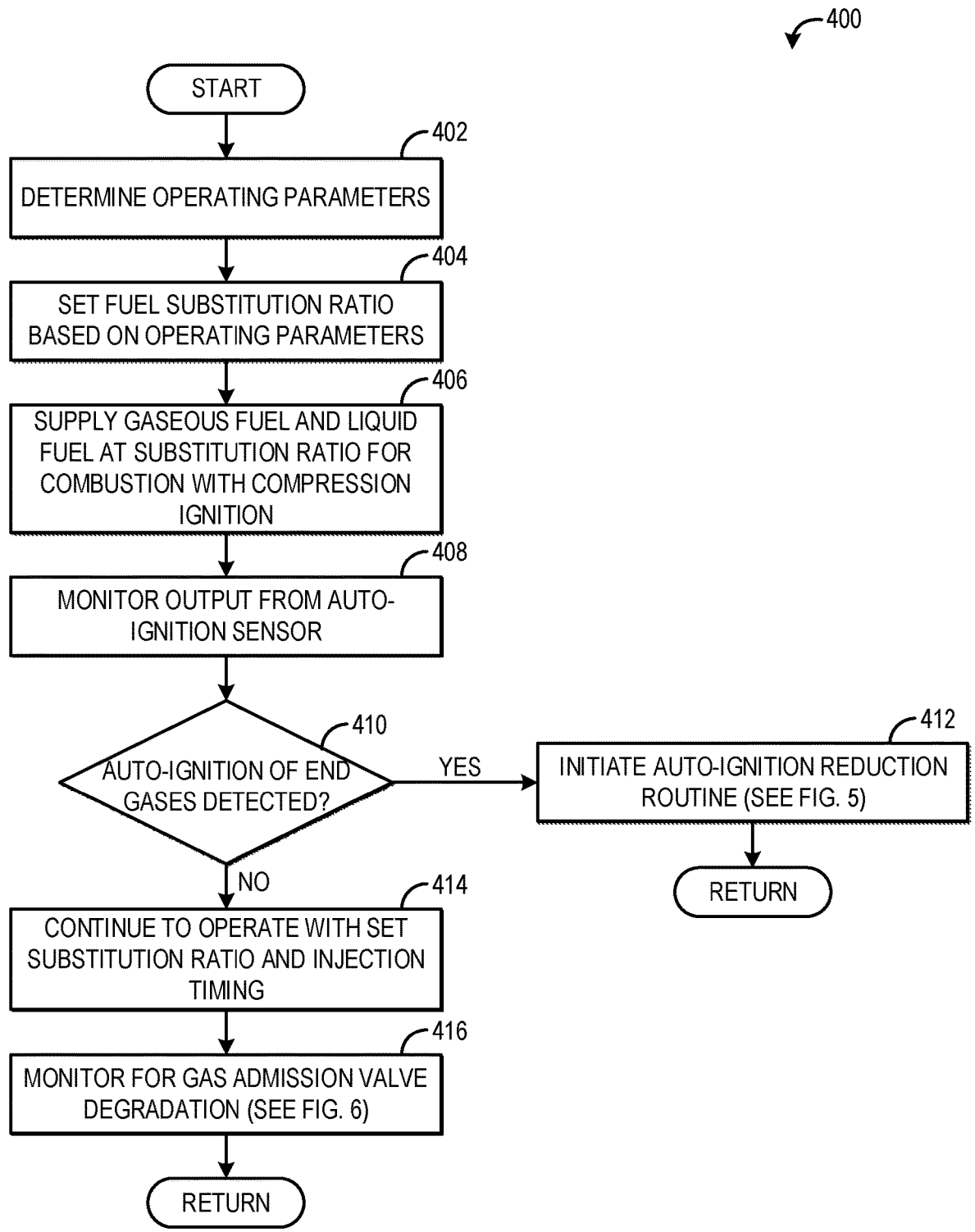
FIGS. 4-6 are flow charts illustrating methods for controlling the engine of FIGS. 1-3, according to an embodiment of the invention.

FIG. 4 is a flow chart illustrating a method 400 for controlling a multi-fuel engine configured to operate with one or more of liquid and gaseous fuel, such as engine 104 of FIGS. 1-3. Method 400 may be carried out according to non-transitory instructions stored in the memory of a control system, such as controller 110. At 402, method 400 includes determining engine operating parameters. The determined engine operating parameters may include engine speed, engine load, current fuel substitution ratio, relative fuel levels in each fuel tank, etc. At 404, method 400 includes setting a fuel substitution ratio based on the operating parameters. The substitution ratio may be set based on engine temperature, desired fuel type, notch throttle position, relative fuel levels in each fuel tank (e.g., if the level of gaseous fuel is below a threshold, more liquid fuel may be used), vehicle location (e.g., whether the vehicle is in a tunnel), and/or other parameters. At 406, the gaseous and/or liquid fuel is supplied to each cylinder of the engine at the set substitution ratio. In some examples, the set substitution ratio may be the same for all cylinders. In other examples, one or more cylinders may have different substitution ratios.

If the substitution ratio is greater than zero (e.g., if at least some gaseous fuel is supplied), the gaseous fuel may be premixed with intake air and combusted due to compression ignition of the injected liquid fuel. The liquid fuel may be supplied via stratified injection, where the liquid fuel is not homogeneous throughout the combustion chamber, but instead varies in a controlled way across the volume of the cylinder. For example, the liquid fuel may be injected into a particular volume of the combustion chamber (e.g., piston crown). The liquid fuel may be injected at a prescribed time during the combustion cycle (such as the end of the compression stroke or beginning of the power stroke) such that the liquid fuel ignites quickly after injection due to increased cylinder temperature at high compression levels. The ignited liquid fuel may then ignite the premixed gaseous fuel and air.

At 408, output from one or more auto-ignition sensors is monitored to determine if auto-ignition is present in any of the cylinders. As explained above, the auto-ignition sensor (such as auto-ignition sensor 334) may detect engine vibrations resulting from auto-ignition of cylinder end gases (e.g., ignition of gaseous fuel and air ahead of the flame front resulting from the ignition of the injected liquid fuel). The detected vibrations that indicate auto-ignition may be vibrations above a threshold level of normal engine vibrations, and may vary based on engine speed or other parameters. At 410, method 400 determines if auto-ignition of end gases is detected in at least one cylinder. If auto-ignition is detected, method 400 proceeds to 412 to initiate an auto-ignition reduction routine, which is explained below with respect to FIG. 5.

If auto-ignition is not detected, method 400 proceeds to 414 to continue to operate with the set substitution ratio and liquid fuel injection timing. At 416, method 400 optionally includes monitoring for gas admission valve degradation, which is explained below with respect to FIG. 6.

Figure 5:
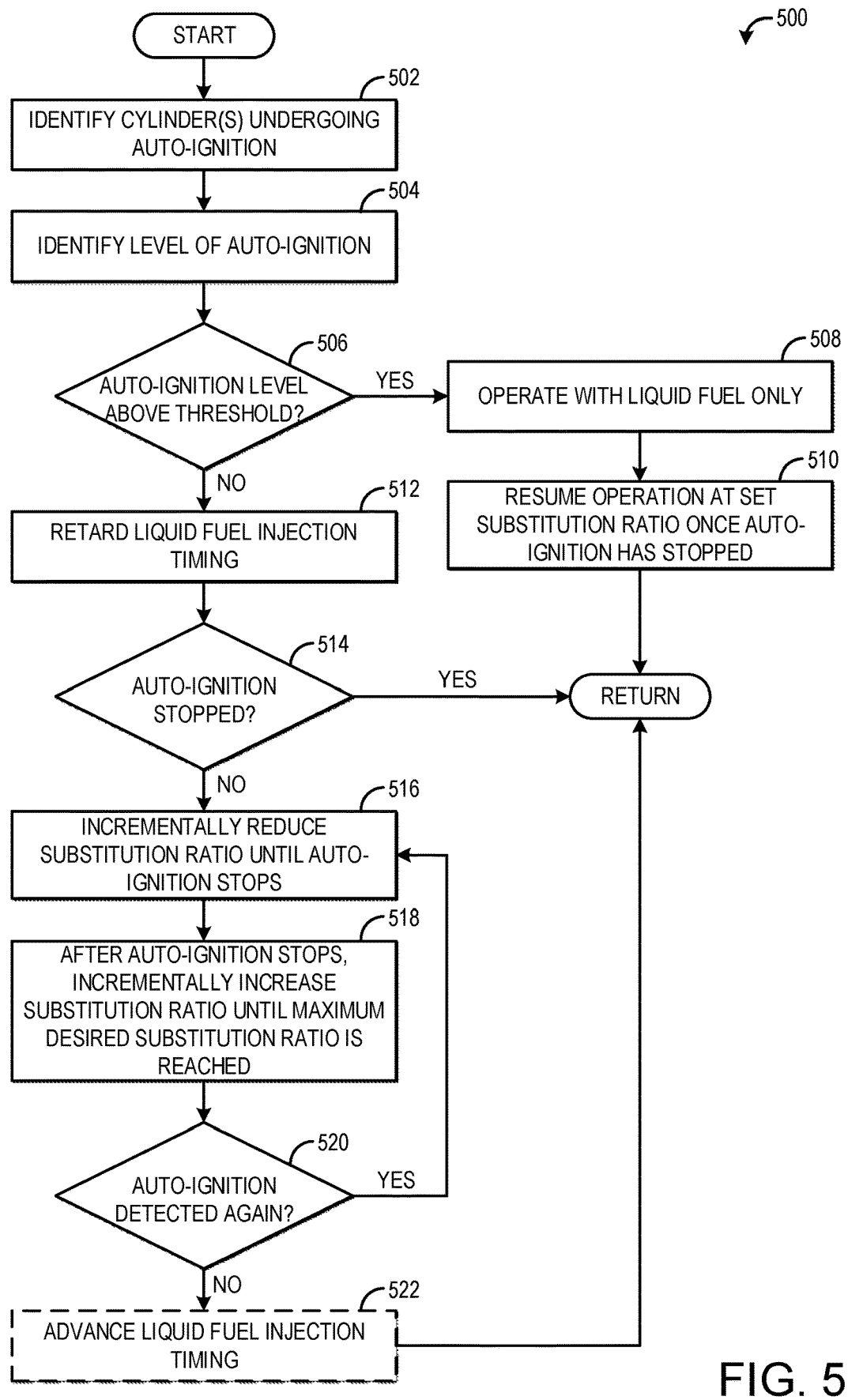

FIG. 5 is a flow chart illustrating a routine 500 for reducing auto-ignition. Routine 500 may be executed in response to an indication of auto-ignition, as explained above with respect to method 400. Routine 500 includes, at 502, identifying the cylinder(s) undergoing auto-ignition. As explained above, cylinder identification may include determining which auto-ignition sensor is indicating auto-ignition is occurring, if more than auto-ignition sensor is present, and/or correlating the timing of the detected auto-ignition to each cylinder's predetermined firing time.

Then, for each cylinder where auto-ignition has been detected, routine 500 includes identifying the level of auto-ignition at 504. The level of auto-ignition may be based on the intensity, frequency, etc., of the vibrations detected by the auto-ignition sensor. At 506, routine 500 determines if the auto-ignition level is above a threshold level. The threshold level may be a high level of auto-ignition that may cause engine degradation if allowed to continue, and/or may be a level of auto-ignition that may be difficult to reduce in a timely manner. If the auto-ignition level is above the threshold, routine 500 proceeds to 508 to operate with liquid fuel only, and shut down the supply of gaseous fuel. The supply of gaseous fuel may be shut down to all the cylinders, or only to the cylinder(s) undergoing auto-ignition. To maintain engine power demand, the amount of liquid fuel supplied to the cylinders is increased. At 510, operation at the set substitution ratio (e.g., including a supply of gaseous fuel) may be resumed once auto-ignition has stopped for a predetermined amount of time. Routine 500 then ends.

Returning to 506, if it is determined that the auto-ignition level is not above the threshold level, routine 500 proceeds to 512 to retard liquid fuel injection timing. In some examples, the liquid fuel injection timing may be retarded by predetermined amount. In other examples, the liquid fuel injection timing may be incrementally retarded until auto-ignition stops. In still further examples, the liquid fuel injection timing may be maintained, and routine 500 may immediately proceed to 516, explained below.

After adjusting the liquid fuel injection timing, routine 500 determines, at 514, if the auto-ignition has stopped. If yes, routine 500 ends. If the retarding of the liquid fuel injection timing has not stopped the auto-ignition (and, in some examples, if the injection timing can be retarded no more), routine 500 proceeds to 516 to incrementally reduce the substitution ratio until the auto-ignition stops. The substitution ratio may be reduced in a suitable manner. For example, the substitution ratio may be reduced by a predetermined amount, such as 5%, and the engine may be monitored for auto-ignition after each incremental reduction. To reduce the substitution ratio, the amount of supplied gaseous fuel may be reduced, the amount of supplied liquid fuel may be increased, or both. When the substitution ratio is decreased, engine power is maintained via an increase in the amount of liquid fuel supplied, for example. In some examples, the substitution ratio may be decreased to zero.

At 518, after auto-ignition has stopped, the substitution ratio may be incrementally increased back towards the set substitution ratio. However, to ensure auto-ignition does not occur again, the substitution ratio may be incremented by a smaller amount, such as 2%. Further, the substitution ratio may be increased to a ratio closer to but lower than the set substitution ratio. The substitution ratio may be increased until a maximum desired substitution ratio is reached (such as the set substitution ratio), or until auto-ignition occurs again. If auto-ignition occurs again, as determined at 520, routine 500 loops back to 516 to again incrementally decrease the substitution ratio until the auto-ignition stops. The process of reducing the substitution ratio until the auto-ignition stops and subsequently increasing the substitution ratio may be repeated until a maximum substitution ratio that is as close to the set substitution ratio as possible but does not cause auto-ignition is reached.

If, at 520, auto-ignition is not detected again, routine 500 optionally includes advancing the liquid fuel injection timing back towards the original (non-retarded) injection timing. Routine 500 then ends.

Thus, routine 500 mitigates auto-ignition of end gases following compression ignition of injected liquid fuel by first retarding the injection timing of the liquid fuel. The liquid fuel injection timing may be initially set to within a margin that prevents the auto-ignition without causing misfire and meets designated emissions levels. If auto-ignition following compression ignition is detected, the injection timing may be retarded. If the retarded injection timing does not reduce the auto-ignition, the substitution ratio may be decreased (e.g., less gaseous fuel and/or more liquid fuel may be supplied). After the auto-ignition has stopped, either the injection timing may be advanced again, the substitution ratio may be increased again, or both, so that the injection timing and substitution ratio are as close to the optimal, predetermined settings as possible without causing the auto-ignition following compression ignition.

The control of liquid fuel injection timing and gaseous fuel substitution ratio may be made on a per-cylinder basis in some embodiments. Accordingly, if only one cylinder is undergoing significant auto-ignition following compression ignition, only the injection timing and/or substitution ratio of that cylinder may be adjusted, while the remaining cylinders are maintained at the optimal settings. For example, one or more of an amount of gaseous fuel supplied and an amount of liquid fuel supplied to only one cylinder may be adjusted, while the remaining cylinders are maintained at the optimal settings. However, in some embodiments, even if auto-ignition is not detected in each cylinder (e.g., if auto-ignition is detected in only a subset of the cylinders), each cylinder may undergo the same injection timing and/or substitution ratio adjustment to control the detected auto-ignition. For example, each cylinder may undergo the same gaseous fuel adjustment and/or liquid fuel adjustment to control the detected auto-ignition. Further, the intensity of the auto-ignition may be monitored. In some examples, if the auto-ignition is of relatively high intensity, it may be quickly reduced by completely stopping the gaseous fuel supply (either to the cylinder undergoing the auto-ignition, or to all cylinders). Then, once conditions resulting the auto-ignition have changed (e.g., engine temperature has decreased), the gaseous fuel supply may be resumed.

Figure 6:
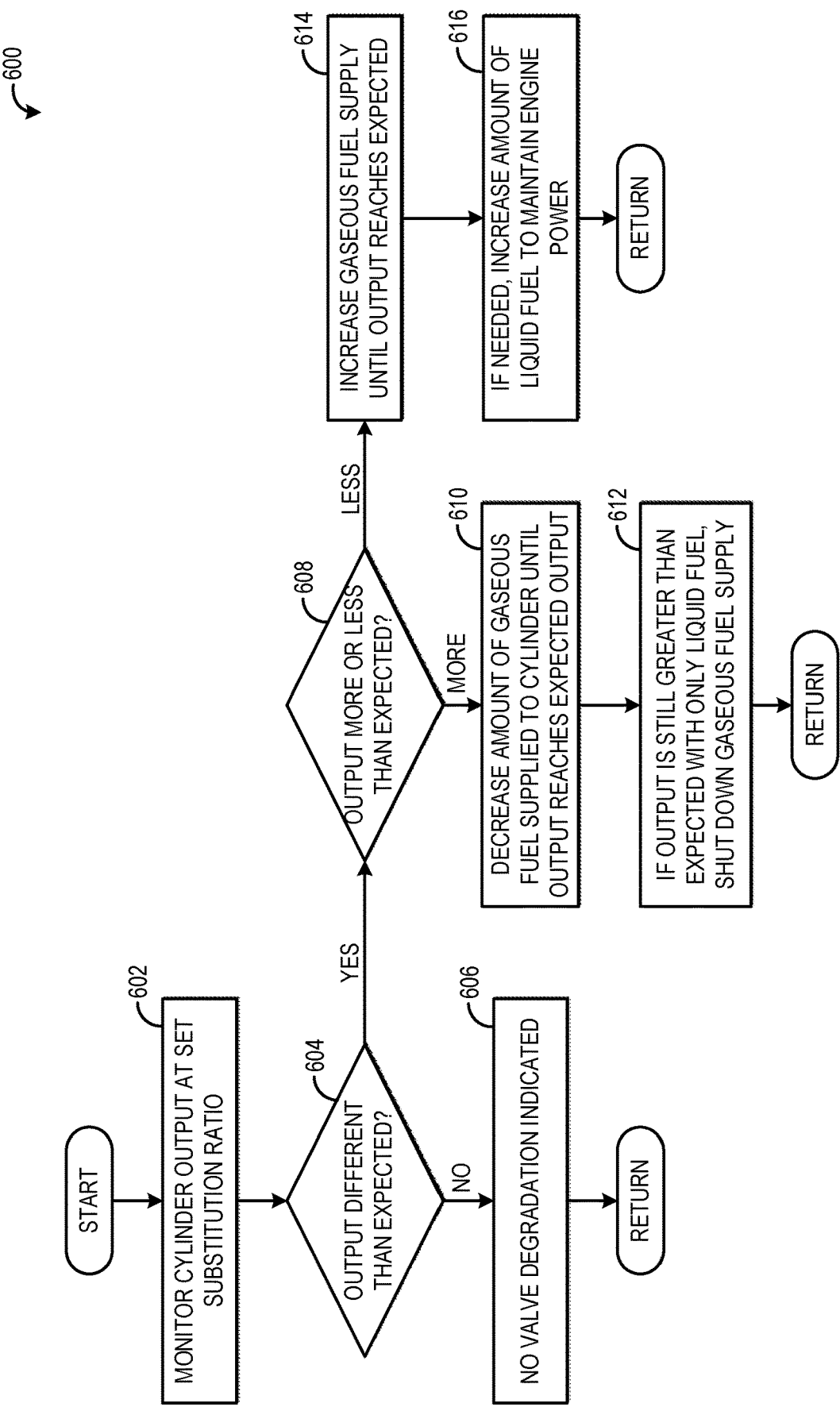

Turning now to FIG. 6, a routine 600 for monitoring gas admission valve degradation status is illustrated. Routine 600 may be executed during gaseous fuel operation without auto-ignition, such as during the method 400 described above, in an engine system that includes a plurality of gas admission valves, each for admitting gaseous fuel to a respective cylinder. At 602, routine 600 includes monitoring cylinder output at the set substitution ratio. The cylinder output may be a suitable output that indicates the power produced by the cylinder during combustion, and may include individual cylinder exhaust temperature, overall engine power (e.g., load placed on alternator), engine speed, or other parameter. At 604, the produced output is compared to an expected output for the given substitution ratio. If the output is not different than the expected output, routine 600 proceeds to 606 to indicate that no degradation to the gas admission valves is present, and routine 600 ends.

If the produced cylinder output is different than expected, routine 600 proceeds to 608 to determine if the produced output is more or less than the expected output. If the produced output is more than expected, routine 600 proceeds to 610 to decrease the amount of gaseous fuel, and in some embodiments liquid fuel, supplied to the cylinder until the cylinder output reaches the expected output. At 612, if the produced output is still greater than the expected output, the gaseous fuel supply to that cylinder may be shutdown, as the gas admission valve may be stuck open. In some embodiments, the cylinder may be operated with only liquid fuel, or the cylinder may be totally shut down and no fuel supplied to the cylinder. Further, a default action may be taken, indicating degradation of the gas admission valve (e.g., a diagnostic code set, indicator lamp lit, etc.). Routine 600 then returns.

If the expected cylinder output is less than the expected output, routine 600 proceeds to 614 to increase the gaseous fuel supply until the output reaches the expected output. At 616, the amount of liquid fuel supplied to the cylinder may also be increased to maintain engine power. For example, if the gas admission valve is stuck closed, an adequate supply of gaseous fuel may not be provided to maintain requested engine power. To compensate, additional liquid fuel may be supplied. Further, a default action may be taken, indicating degradation of the gas admission valve (e.g., a diagnostic code set, indicator lamp lit, etc.). Routine 600 then returns.

Thus, the systems and methods described herein provide for embodiments for reducing auto-ignition of end gases following compression ignition of injected liquid fuel in a multi-fuel engine configured to operate with both liquid and gaseous fuel. End gases may include the fuel-air mixture that has been introduced into the cylinder but not yet consumed in the flame-front reaction of the compression-ignition of the liquid fuel. In one example, a system comprises a first fuel system to deliver liquid fuel to at least one cylinder of an engine, a second fuel system to deliver gaseous fuel to the at least one cylinder, and a controller. The controller is configured to control the supply of the gaseous fuel to the at least one cylinder, inject the liquid fuel to the at least one cylinder thereby to ignite the liquid fuel and the gaseous fuel in the at least one cylinder via compression-ignition of the liquid fuel, and adjust an amount of gaseous fuel (e.g., relative to an amount of liquid fuel) based on a measured parameter associated with auto-ignition of end gases subsequent to the compression-ignition of the liquid fuel. The amount of gaseous fuel to liquid fuel (substitution rate) is not initially based on the presence of auto-ignition, but on other parameters such as throttle notch position, engine temperature, etc. The substitution rate may decrease (less gaseous fuel and more liquid fuel) only under auto-ignition conditions when adjustments in liquid fuel injection timing does not reduce the auto-ignition as monitored via one or more sensors measuring cylinder vibrations.

The measured parameter may include engine vibrations detected by an accelerometer, for example. The injection of the liquid fuel may comprise a stratified injection of liquid fuel. In some examples, the liquid fuel is diesel fuel, and the first fuel system comprises a fuel tank for holding the diesel fuel, a common fuel rail, and at least one fuel injector. The diesel fuel in the fuel tank may be supplied to the common fuel rail by at least one fuel pump, the common fuel rail may be configured to supply the diesel fuel to each fuel injector of the at least one fuel injector, and each fuel injector of the at least one fuel injector may be coupled to a respective cylinder of the at least one cylinder of the engine. The gaseous fuel may be natural gas, and the second fuel system may comprise a fuel tank to hold the natural gas, and at least one gas admission valve, each gas admission valve of the at least one gas admission valve coupled to a respective cylinder of the at least one cylinder of the engine. However, in some examples, rather than including a plurality of gas admission valves, each coupled to a respective cylinder, the second fuel system may include a single gaseous fuel control valve to regulate an amount of gaseous fuel mixed with intake air upstream of the cylinders.

The controller may be configured to retard an injection timing of the injection of liquid fuel in response to the measured parameter. The controller may be configured to decrease the amount of gaseous fuel relative to the amount of liquid fuel in response to the measured parameter. In some examples, after decreasing the amount of gaseous fuel relative to the amount of liquid fuel and responsive to the measured parameter indicating that the auto-ignition of end gases has ceased, the controller may be configured to increase the amount of gaseous fuel relative to the amount of liquid fuel. Further, after decreasing the amount of gaseous fuel relative to the amount of liquid fuel and responsive to the measured parameter indicating that the auto-ignition of end gases has not ceased, the controller may be configured deactivate the supply of gaseous fuel to the at least one cylinder and increase the amount of liquid fuel to maintain engine power.

To decrease the amount of gaseous fuel relative to the amount of liquid fuel, one or more gas admission valves may be adjusted. For example, one or more gas admission valves degree and/or duration of opening may be reduced to reduce the amount of gaseous fuel. In single-point fumigation systems, to decrease the amount of gaseous fuel relative to the amount of liquid fuel, a gaseous fuel control valve may be adjusted to reduce the amount of gaseous fuel mixed with the intake air upstream of the cylinders (e.g., in the intake manifold or intake passage upstream of the intake manifold). In such systems, the amount of liquid fuel may be increased, maintained, or reduced in lower proportion or lower magnitude with respect to the reduction of the amount of gaseous fuel.

The at least one cylinder may comprise a first cylinder including a first gas admission valve and a first liquid fuel injector, and a second cylinder including a second gas admission valve and a second liquid fuel injector. The controller may be configured to identify, based on the measured parameter, if the auto-ignition is occurring in the first cylinder, the second cylinder, or both the first and second cylinders.

If the auto-ignition is detected in both the first cylinder and the second cylinder, the controller is configured to reduce the auto-ignition by one or more of: retarding injection timing of liquid fuel injection from the first liquid fuel injector and the second liquid fuel injector; or increasing an amount of liquid fuel injected by the first fuel injector relative to an amount of gaseous fuel supplied by the first gas admission valve and increasing an amount of liquid fuel injected by the second fuel injector relative to an amount of gaseous fuel supplied by the second gas admission valve.

If the auto-ignition is detected in the first cylinder and not in the second cylinder, the controller is configured to reduce the auto-ignition in the first cylinder by one or more of: retarding injection timing of liquid fuel injection from the first liquid fuel injector while maintaining injection timing of liquid fuel injection from the second liquid fuel injector; or increasing an amount of liquid fuel injected by the first fuel injector relative to an amount of gaseous fuel supplied by the first gas admission valve while maintaining an amount of liquid fuel injected by the second fuel injector relative to an amount of gaseous fuel supplied by the second gas admission valve.

The controller may be configured to identify a level of auto-ignition in each of the first cylinder and second cylinder based on the measured parameter, and if the level of auto-ignition in the first cylinder is above a threshold level, the controller is configured to deactivate the first gas admission valve (e.g., maintain the gas admission valve in a fully closed position) and increase the amount of liquid fuel injected by the first fuel injector to maintain engine power.

In another example, a system comprises a first fuel system operable to deliver liquid fuel to a plurality of cylinders in an engine, the first fuel system comprising a first fuel tank, a common fuel rail, and a plurality of fuel injectors, each fuel injector configured to inject liquid fuel to a respective cylinder of the plurality of cylinders; a second fuel system operable to deliver gaseous fuel to the plurality of cylinders, the second fuel system comprising a second fuel tank and a plurality of gas admission valves, each gas admission valve configured to supply gaseous fuel to a respective cylinder of the plurality of cylinders; and a control system. The control system is configured to, for each cylinder, combust a mixture of the gaseous fuel and air by injecting liquid fuel to each cylinder of the plurality of cylinders, the gaseous fuel and liquid fuel provided at a first ratio; if auto-ignition of end gases after primary ignition resulting from the injection of the liquid fuel is detected in at least one cylinder, retard an injection timing of injection of the liquid fuel to the at least one cylinder; and if the auto-ignition is still detected after the retarding of the injection timing, adjust at least one of an amount of the gaseous fuel or an amount of the liquid fuel provided to the at least one cylinder to a second ratio, different than the first ratio.

The injection of liquid fuel may comprise stratified injection, and the combustion of the mixture of gaseous fuel and air by the injection of the liquid fuel may comprise compression ignition of the liquid fuel with the mixture of the gaseous fuel and air so as to combust the mixture of the gaseous fuel and air via a propagating flame front resulting from the compression ignition of the liquid fuel. The control system may be configured to, when adjusting said at least one of the amount of the gaseous fuel or the amount of the liquid fuel to the second ratio, increase the amount of liquid fuel relative to the amount of gaseous fuel.

In a further example, a method comprises supplying gaseous fuel to at least one cylinder of an engine; igniting the gaseous fuel and intake air by injecting liquid fuel to the at least one cylinder and compression igniting the injected liquid fuel, the gaseous fuel and liquid fuel provided to the at least one cylinder at a substitution ratio; and in response to a measured parameter associated with auto-ignition of end gases after the ignition resulting from the injection of the liquid fuel to the at least one cylinder, adjusting the substitution ratio.

The substitution ratio comprises a ratio of the gaseous fuel to the liquid fuel provided to the at least one cylinder, and adjusting the substitution ratio may comprise decreasing the substitution ratio.

The method may further comprise monitoring cylinder output resulting from combustion of the gaseous fuel at the substitution ratio; and if the cylinder output differs from an expected output by more than a threshold amount, indicating degradation of a gas admission valve configured to supply the gaseous fuel to the at least one cylinder. The method may further comprise, if the cylinder output is greater than the expected output, decreasing one or more of an amount of the gaseous fuel or an amount of the liquid fuel supplied to the at least one cylinder, and if the cylinder output is still greater than the expected output subsequent to said decreasing of the one or more of the amount of the gaseous fuel or the amount of the liquid fuel, indicating the gas admission valve is open by more than a desired amount and deactivating the supply of gaseous fuel. The method may further comprise, if the cylinder output is less than the expected output, increasing an amount of the liquid fuel supplied to the at least one cylinder until the cylinder output equals the expected output. The cylinder output may comprise one or more of engine power or exhaust gas temperature.

In an embodiment, a system comprises a first fuel system to deliver liquid fuel to at least one cylinder of an engine, a second fuel system to deliver gaseous fuel to the at least one cylinder, and a controller. The controller is configured to control the second fuel system for supplying the gaseous fuel to the at least one cylinder, and to control the first fuel system for injection of the liquid fuel to the at least one cylinder, for ignition of the liquid fuel by compression ignition and subsequent combustion of the gaseous fuel. The controller is further configured to control at least one of the second fuel system or the first fuel system to adjust an amount of the gaseous fuel (supplied to the at least one cylinder) relative to an amount of the liquid fuel (injected into the at least one cylinder) based on a measured parameter associated with auto-ignition of end gases subsequent to the compression-ignition of the liquid fuel.

In another embodiment of the system, the controller is configured to control retarding of an injection timing of the injection of the liquid fuel in response to the measured parameter. The measured parameter comprises vibration of the engine.

In another embodiment of the system, the controller is configured to control the at least one of the second fuel system or the first fuel system to decrease the amount of the gaseous fuel relative to the amount of the liquid fuel in response to the measured parameter. (For example, the second fuel system may be controlled to decrease the amount of gaseous fuel while the first fuel system is controlled for the amount of liquid fuel to remain static, increase, or even decrease but not to the extent that would prevent the ratio of gaseous fuel to liquid fuel from decreasing, or the first fuel system may be controlled to increase the amount of liquid fuel while the second fuel system is controlled for the amount of gaseous fuel to remain static, decrease, or even increase but not to the extent that would prevent the ratio of gaseous fuel to liquid fuel from decreasing.)

In another embodiment of the system, the controller is configured to, after controlling decreasing the amount of gaseous fuel relative to the amount of liquid fuel and responsive to the measured parameter indicating that the auto-ignition of end gases has ceased, control at least one of the second fuel system or the first fuel system to increase the amount of gaseous fuel relative to the amount of liquid fuel. (For example, the second fuel system may be controlled to increase the amount of gaseous fuel while the first fuel system is controlled for the amount of liquid fuel to remain static, decrease, or even increase but not to the extent that would prevent the ratio of gaseous fuel to liquid fuel from increasing, or the first fuel system may be controlled to decrease the amount of liquid fuel while the second fuel system is controlled for the amount of gaseous fuel to remain static, increase, or even decrease but not to the extent that would prevent the ratio of gaseous fuel to liquid fuel from increasing.)

In another embodiment of the system, the controller is configured to, after decreasing the amount of gaseous fuel relative to the amount of liquid fuel and responsive to the measured parameter indicating that the auto-ignition of end gases has not ceased, control the second fuel system to deactivate the supply of gaseous fuel to the at least one cylinder and control the first fuel system to increase the amount of liquid fuel to maintain engine power.

In another embodiment of the system, the injection of the liquid fuel comprises a stratified injection of the liquid fuel, e.g., the controller may be configured to control the first fuel system for the injection of the liquid fuel into the at least one cylinder to be a stratified injection.

In another embodiment of the system, the at least one cylinder comprises a first cylinder including a first gas admission valve and a first liquid fuel injector, and a second cylinder including a second gas admission valve and a second liquid fuel injector. The controller is configured to identify, based on the measured parameter, if the auto-ignition is occurring in the first cylinder, the second cylinder, or both the first and second cylinders. According to another aspect, if the auto-ignition is detected in both the first cylinder and the second cylinder, the controller is configured to reduce the auto-ignition by one or more of: controlling the first fuel system to retard injection timing of the liquid fuel injection from the first liquid fuel injector and the second liquid fuel injector; or controlling at least one of the first fuel system or the second fuel system to increase an amount of liquid fuel injected by the first fuel injector relative to an amount of gaseous fuel supplied by the first gas admission valve and increase an amount of liquid fuel injected by the second fuel injector relative to an amount of gaseous fuel supplied by the second gas admission valve. According to another aspect, additionally or alternatively, if the auto-ignition is detected in the first cylinder and not in the second cylinder, the controller is configured to reduce the auto-ignition in the first cylinder by one or more of: controlling the first fuel system to retard injection timing of liquid fuel injection from the first liquid fuel injector while maintaining injection timing of liquid fuel injection from the second liquid fuel injector; or control at least one of the first fuel system or the second fuel system to increase an amount of liquid fuel injected by the first fuel injector relative to an amount of gaseous fuel supplied by the first gas admission valve while maintaining an amount of liquid fuel injected by the second fuel injector relative to an amount of gaseous fuel supplied by the second gas admission valve. The controller may be further configured to identify a level of auto-ignition in each of the first cylinder and second cylinder based on the measured parameter, and if the level of auto-ignition in the first cylinder is above a threshold level, the controller is configured to control the second fuel system to deactivate the first gas admission valve and to control the first fuel system to increase the amount of liquid fuel injected by the first fuel injector to maintain engine power.

In another embodiment of the system, the liquid fuel is diesel fuel. The first fuel system comprises a fuel tank for holding the diesel fuel, a common fuel rail, at least one fuel injector, and at least one fuel pump. The diesel fuel in the fuel tank is supplied to the common fuel rail by the at least one fuel pump. The common fuel rail is configured to supply the diesel fuel to each fuel injector of the at least one fuel injector. Each fuel injector of the at least one fuel injector is coupled to a respective cylinder of the at least one cylinder of the engine.

In another embodiment of the system, the gaseous fuel is natural gas. The second fuel system comprises a fuel tank and at least one gas admission valve. Each gas admission valve of the at least one gas admission valve is coupled to a respective cylinder of the at least one cylinder of the engine.

In another embodiment of the system, the liquid fuel is diesel fuel and the gaseous fuel is natural gas. The first fuel system comprises a fuel tank for holding the diesel fuel, a common fuel rail, at least one fuel injector, and at least one fuel pump. The diesel fuel in the fuel tank is supplied to the common fuel rail by the at least one fuel pump. The common fuel rail is configured to supply the diesel fuel to each fuel injector of the at least one fuel injector. Each fuel injector of the at least one fuel injector is coupled to a respective cylinder of the at least one cylinder of the engine. The second fuel system comprises a fuel tank (for storage of the natural gas) and at least one gas admission valve. Each gas admission valve of the at least one gas admission valve is coupled to a respective cylinder of the at least one cylinder of the engine.

In a further embodiment, a system comprises a first fuel system operable to deliver liquid fuel to a plurality of cylinders in an engine, the first fuel system comprising a first fuel tank, a common fuel rail, and a plurality of fuel injectors, each fuel injector configured to inject liquid fuel to a respective cylinder of the plurality of cylinders; a second fuel system operable to deliver gaseous fuel to the plurality of cylinders, the second fuel system comprising a second fuel tank and gaseous fuel control valve configured to supply gaseous fuel to the plurality of cylinders; and a control system. The control system is configured to, for each cylinder, combust a mixture of the gaseous fuel and air by injecting liquid fuel to each cylinder of the plurality of cylinders, the gaseous fuel and liquid fuel provided at a first ratio; if auto-ignition of end gases after primary ignition resulting from the injection of the liquid fuel is detected in at least one cylinder, retard an injection timing of injection of the liquid fuel to the at least one cylinder; and if the auto-ignition is still detected after the retarding of the injection timing, adjust at least one of an amount of the gaseous fuel or an amount of the liquid fuel provided to the at least one cylinder to a second ratio, different than the first ratio. The amount of gaseous fuel may be adjusted by controlling the position and/or opening duration of the gaseous fuel control valve.

As explained above, the terms "high pressure" and "low pressure" are relative, meaning that "high" pressure is a pressure higher than a "low" pressure. Conversely, a "low" pressure is a pressure lower than a "high" pressure.

As used herein, an element or step recited in the singular and preceded with the word "a" or "an" should be understood as not excluding plural of said elements or steps, unless such exclusion is explicitly stated. Furthermore, references to "one embodiment" or "one example" of the present invention are not intended to be interpreted as excluding the existence of additional embodiments or examples that also incorporate the recited features. Moreover, unless explicitly stated to the contrary, embodiments "comprising," "including," or "having" an element or a plurality of elements having a particular property may include additional such elements not having that property. The terms "including" and "in which" are used as the plain-language equivalents of the respective terms "comprising" and "wherein." Moreover, the terms "first," "second," and "third," etc. are used merely as labels, and are not intended to impose numerical requirements or a particular positional order on their objects.

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The invention claimed is:

1. A system, comprising:
at least one fuel system configured to supply liquid fuel and gaseous fuel to at least one cylinder of an engine; and
a controller storing non-transitory instructions executable to:
initiate ignition of the gaseous fuel and intake air by controlling injection of the liquid fuel to the at least one cylinder and compression ignition of the injected liquid fuel;
in response to a measured parameter associated with auto-ignition of end gases after the compression ignition resulting from the injection of the liquid fuel to the at least one cylinder, retard an injection timing of the injection of the liquid fuel.

2. The system of claim 1, wherein the controller stores further non-transitory instructions executable to adjust an amount of the gaseous fuel in response to the measured parameter.

3. The system of claim 1, wherein the gaseous fuel is one or more of natural gas, ammonia, syngas, hydrogen, ethanol, methanol, and dimethyl ether.

4. The system of claim 1, wherein the liquid fuel is one or more of diesel, biodiesel, ethanol, methanol, and dimethyl ether.

5. A vehicle comprising the system of claim 1.

6. A method, comprising:
supplying gaseous fuel to at least one cylinder of an engine;
igniting the gaseous fuel and intake air by injecting liquid fuel to the at least one cylinder and compression igniting the injected liquid fuel, the gaseous fuel and the liquid fuel provided to the at least one cylinder at a substitution ratio;
in response to a measured parameter associated with auto-ignition of end gases after the compression ignition resulting from the injection of the liquid fuel to the at least one cylinder:
adjusting the substitution ratio; and
retarding an injection timing of the injection of the liquid fuel.

7. The method of claim 6, wherein the substitution ratio comprises a ratio of the gaseous fuel to the liquid fuel provided to the at least one cylinder, and wherein adjusting the substitution ratio comprises decreasing the substitution ratio.

8. The method of claim 6, further comprising:
monitoring a cylinder output resulting from combustion of the gaseous fuel at the substitution ratio; and
if the cylinder output differs from an expected output by more than a threshold amount, indicating degradation of a gas admission valve configured to supply the gaseous fuel to the at least one cylinder.

9. The method of claim 8, further comprising, if the cylinder output is greater than the expected output, decreasing one or more of an amount of the gaseous fuel and an amount of the liquid fuel supplied to the at least one cylinder, and if the cylinder output is still greater than the expected output subsequent to decreasing the one or more of the amount of the gaseous fuel and the amount of the liquid fuel supplied to the at least one cylinder, indicating the gas admission valve is open by more than a desired amount and deactivating the supply of the gaseous fuel.

10. The method of claim 8, further comprising, if the cylinder output is less than the expected output, increasing an amount of the liquid fuel supplied to the at least one cylinder until the cylinder output equals the expected output, and wherein the cylinder output comprises one or more of an engine power and an exhaust gas temperature.

11. The method of claim 6, wherein the engine is on a vehicle, the engine configured for propulsion of the vehicle.

12. The method of claim 6, wherein the gaseous fuel is one or more of natural gas, ammonia, syngas, hydrogen, ethanol, methanol, and dimethyl ether.

13. The method of claim 6, wherein the liquid fuel is one or more of diesel, biodiesel, ethanol, methanol, and dimethyl ether.

14. A system, comprising:
a first fuel system operable to deliver liquid fuel to a plurality of cylinders in an engine, the first fuel system comprising a first fuel tank, a common fuel rail, and a plurality of fuel injectors, each of the plurality of fuel injectors configured to inject the liquid fuel to a respective cylinder of the plurality of cylinders;
a second fuel system operable to deliver gaseous fuel to the plurality of cylinders, the second fuel system comprising a second fuel tank and a plurality of gas admission valves, each of the plurality of gas admission valves configured to supply the gaseous fuel to a respective cylinder of the plurality of cylinders; and
a controller storing non-transitory instructions executable to, for each respective cylinder of one or more of the plurality of cylinders:
initiate ignition of the gaseous fuel and intake air by controlling injection of the liquid fuel to the respective cylinder and compression ignition of the injected liquid fuel;
in response to a measured parameter associated with auto-ignition of end gases after the compression ignition resulting from the injection of the liquid fuel to the respective cylinder being a first auto-ignition level less than a threshold level, retard an injection timing of the liquid fuel to the respective cylinder; and
in response to the measured parameter being a second auto-ignition level greater than the threshold level, shut down supply of the gaseous fuel.

15. The system of claim 14, wherein the controller stores further non-transitory instructions executable to, for each respective cylinder of the one or more of the plurality of cylinders, adjust an amount of the gaseous fuel in response to the measured parameter being the first auto-ignition level less than the threshold level.

16. The system of claim 14, wherein the gaseous fuel is one or more of natural gas, ammonia, syngas, hydrogen, ethanol, methanol, and dimethyl ether.

17. The system of claim 14, wherein the liquid fuel is one or more of diesel, biodiesel, ethanol, methanol, and dimethyl ether.

18. The system of claim 14, wherein the first fuel tank is on a first vehicle, and the second fuel tank is on a second, fuel tender vehicle that is coupled to the first vehicle.

19. The system of claim 18, wherein the controller and the engine are on the first vehicle.

20. A vehicle comprising the system of claim 14.

* * * * *